June 16, 1959 S. PAULL 2,891,170

SEQUENTIAL PULSE GENERATOR

Filed May 27, 1957 2 Sheets-Sheet 1

INVENTOR
STEPHEN PAULL

BY W R Maltby
Richard C Read
ATTORNEYS

June 16, 1959 S. PAULL 2,891,170

SEQUENTIAL PULSE GENERATOR

Filed May 27, 1957 2 Sheets-Sheet 2

INVENTOR
STEPHEN PAULL

BY W R Maltby
Richard C Reed ATTORNEYS 2,891,170

SEQUENTIAL PULSE GENERATOR

Stephen Paull, Falls Church, Va.

Application May 27, 1957, Serial No. 661,975

10 Claims. (Cl. 307—88)

(Granted under Title 35, U.S. Code (1952), sec. 266)

The invention described herein may be manufactured and used by or for the Government of the United States of America for governmental purposes without the payment of any royalties thereon or therefor.

This invention relates to electronic circuits using binary magnetic storage elements in general, and more particularly to a sequential pulse generator.

This invention provides an efficient circuit which is usable as a time delay circuit and the like, and is usable in devices which require an electronic sequential pulse generator such as a telemetering device.

Prior sequential pulse generators have required a power source which was continually turned "on," have combined a carrier current or a "clock" with the input signal to furnish energy for sequential operation and have had the operation of the generator subjected to the limitations of the "clock" whereby random operation in a plurality of modes was prohibited.

It is an object of this invention to provide a magnetic-core sequential pulse generator which extracts energy from a power source during core flux reversals only.

A further object is to provide a magnetic core pulse generator such that the input pulse is sufficient to trigger the operation of the generator, and is not required to furnish energy for flux reversal.

A still further object is to provide a magnetic core sequential pulse generator which is capable of operating with input pulses which are spaced either regularly or at random.

Another object of this invention is to provide a device wherein output pulses appear sequentially across windings on successive cores.

Still another object is to provide a device wherein the maximum required width of the input pulse is no greater than the switch closing time which, in turn, is determined by switch characteristics and by circuit parameters.

Another object of the present invention is the provision of a magnetic core pulser circuit which operates in the manner of a blocking oscillator or flip-flop circuit.

A final object is to provide a magnetic core pulser circuit in which transistors are used as switching devices.

The exact nature of this invention as well as other objects and advantages thereof will be readily apparent from consideration of the following specification relating to the annexed drawing in which:

Fig. 1 is a schematic diagram of a two stage magnetic sequential pulser of the present invention.

Fig. 2 is a graphic showing of the relationship of the trigger pulses at input 22 to the pulses at points 29 and 31 in Fig. 1.

Figure 1:
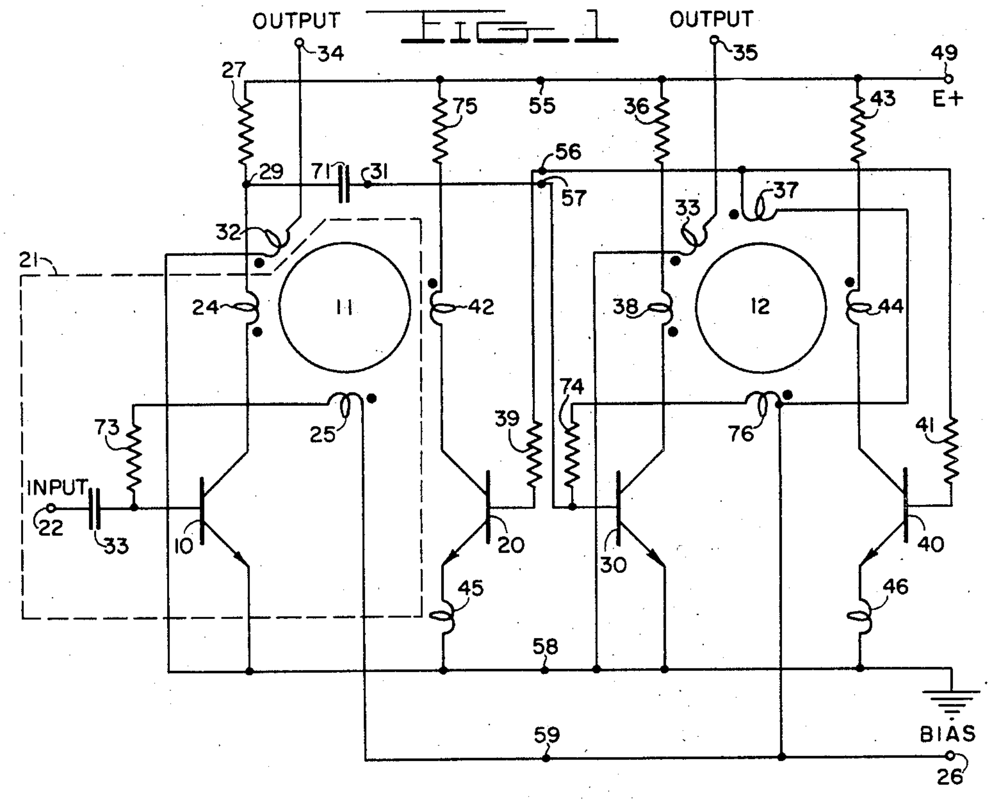
Figure 5:
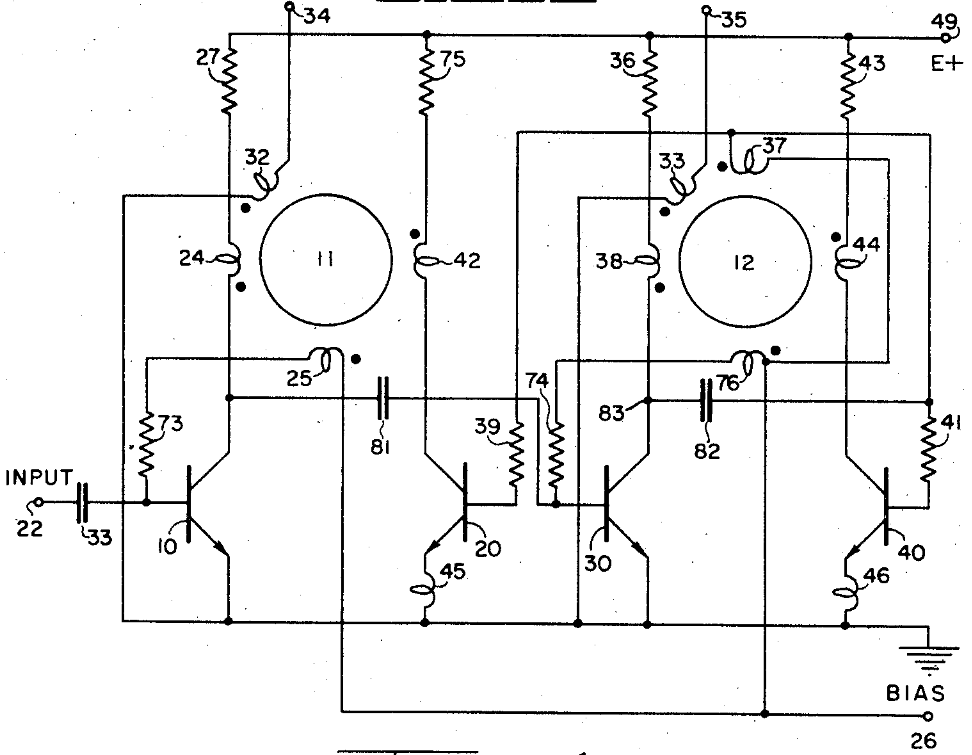
Fig. 5 is a schematic diagram of a modification of the invention.

Referring now to the drawings wherein like reference characters designate like or corresponding parts in all figures, the magnetic cores 11 and 12, in Figs. 1 and 5, are of rectangular hysteresis loop material such as molybdenum-iron-nickel thin tapes or ferrites, or the like.

The flux density remaining after the removal of a saturating magnetizing force is known as "remanence." Positive remanence is known as condition or state "1" and negative remanence is known as condition or state "0."

In the operation of the circuit of Fig. 1, cores 11 and 12 are initially in "0" condition and all transistor switches are initially biased to cut-off or open. The circuit which is isolated by dotted line 21 is the circuit to switch the condition of core 11 from "0" to "1." A positive trigger pulse is applied at input 22 to the base of n–p–n transistor 10 through capacitor 23 to close transistor switch 10.

By convention, the magnetizing force of a current which enters a dotted terminal of a winding associated with a magnetic core tends to change such core from a "1" to a "0" condition. The current passing through winding 24 enters an undotted terminal and, consequently, changes core 11 from "0" to "1." During such change, the positive voltage induced across bias winding 25 is sufficiently in excess of the cut-off bias voltage supplied from negative potential source 26, to maintain transistor switch 10 in closed condition from the time of the said positive trigger pulse until the magnetic core 11 reaches saturation in the "1" condition. Upon saturation of core 11 in "1" condition, the voltage drops induced across all windings disappear and, consequently, the transistor cut-off bias will again open the transistor switch 10 to halt the flow of current through winding 24. Core 11 is now in condition "1" and core 12 in condition "0".

When the current through winding 24, which is the same current as through resistance 27, stops, the difference of potential across coupling resistance 27 disappears and the resultant rise of potential at point 29 produces a positive trigger pulse which is delivered to point 31 and to the base of transistor switch 30. Such positive trigger pulse closes transistor switch 30 to operate the switching circuit for core 12. Core 12 is then switched from condition "0" to "1." Cores 11 and 12 are now in condition "1."

Typical output windings 32 and 33 are provided for illustrative purposes and are of a polarity to provide a positive output potential at outputs 34 and 35 during the change of the cores from "0" to "1."

It is noted that the polarity in the flux saturation switching circuit 21 is such that switching can be accomplished from condition "0" to "1" but not from "1" to "0."

Simultaneous resetting of all of the cores to condition "0" is accomplished automatically in this invention. The reset operation can be best understood by first referring to Fig. 4 wherein an idealized showing of a hysteresis loop of a binary magnetic core appears. When the magnetizing saturating force H is positively polarized, the flux density B of the core reaches saturation at point 69. Such is the case in the changing of a core from "0" to "1," as during the time of the change of core 12 to a "1" discussed above. When a core is saturated fully as at point 69, no further change of flux alignment exists and all voltages induced in the core windings disappear, including the voltage which maintains the transistor switch closed. The saturating magnetizing force from power supply 49 is, therefore, inactivated. The incapability of the core 12 to retain a state of saturation as shown at 69 results in a drop of flux saturation to stabilize at the positive level of remanence designated in Fig. 4 as point 67 and conventionally called "1." Such drop of flux saturation induces a voltage of positive polarity in winding 37 which is of sufficient magnitude to simultaneously close all reset transistor switches, 20 and 40, for example, and thereby trigger the negatively polarized saturating magnetizing force into activity in all reset windings, such as 42 and 44. The positively polarized voltage induced across winding 37 during the resetting of the cores from "1" to "0" maintains all reset transistor switches such as 20 and 40 in closed condition during such resetting. To prevent triggering of transistor switches 10 and 30 by the pulse induced by the return from negative saturation 72 to negative remanence "0," chokes 45 and 46, in each reset circuit between the transistor switch and ground, provide for maintaining such pulse at a level below the threshold of switching of the transistors. Since the voltage drop induced across a winding on a magnetic core is proportional to the rate of change of flux in such core, the chokes oppose the change in current in the reset circuit to cause the reset transistor switches to turn off gradually instead of instantaneously. Such gradual turn off slows the return from negative saturation 72 to negative remanence "0" to such an extent that windings such as 25 and 76 do not produce a pulse of sufficient energy to turn on transistor switches such as 10 and 30. The chokes are effective to prevent the sequential pulse generator from oscillating when included in the reset circuits as shown. It is obvious that chokes could be included in the core switching circuits if desired. It is noted that resistors 73 and 74 are current limiting means to assist in keeping unwanted positive pulses below the threshold of operation of the transistor switches 10 and 30. Current balancing resistors 75 and 43 included in the reset circuts are also effective current control elements.

Oscillation of the sequential pulse generator is thus precluded by the combined influence of the chokes, the current balancing resistors and the resistors in the transistor switch control circuits.

All of the cores are now in condition "0."

The circuit is now capable of being operated upon the receipt of another positive trigger pulse at input 22. Such pulse initiates the operation to the generator which progresses in exactly the same manner as did the operation triggered by the first input pulse.

Figure 2:
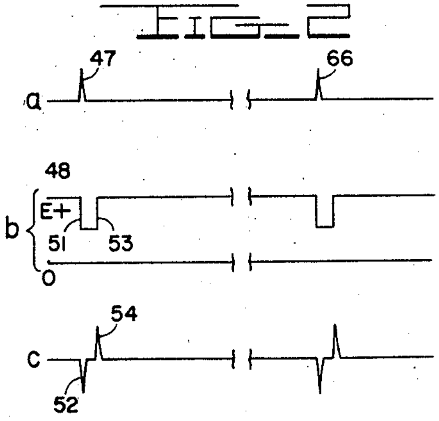

In Fig. 2, sections *a*, *b*, and *c* show representations of the pulses at input 22 and at points 29 and 31 respectively. It is noted that before the arrival of the input pulse 47, the potential 48 at point 29 is the same as the power supply 49. When the pulse 47 closes transistor switch 10 and current flows through resistor 27, the potential at point 29 drops to a level represented by 51. The negative pulse 52 which is simultaneously produced at point 31 merely adds to the negative bias voltage at transistor switch 30 to maintain said switch 30 in open condition.

Upon saturation of core 11, current will no longer flow through winding 25 and transistor switch 10 is opened, and current no longer flows through winding 24. At such instant, the potential rise 53 produces positive trigger pulse 54 at point 31. Upon receipt of pulse 54 at the base of transistor switch 30, such switch is closed and the second stage of the pulser is then operated.

It is readily seen that the sequential pulser of Fig. 1 can be modified to have any plurality of pulser stages. The structure which appears to the left of a line formed by joining points 55, 56, 57, 58 and 59 is a complete pulser stage. A second stage which duplicates the first pulser stage can be provided with its B potential source connected at point 55, its reset transistor switch connected at point 56, its input transistor connected at point 57, its ground connected at point 58 and its transistor cut-off bias connected at 59. It is seen that any desired number of stages can be provided. The circuit to the right of a line joining points 55, 56, 57, 58 and 59 is a complete "*n*th" stage pulser circuit.

Figure 3:
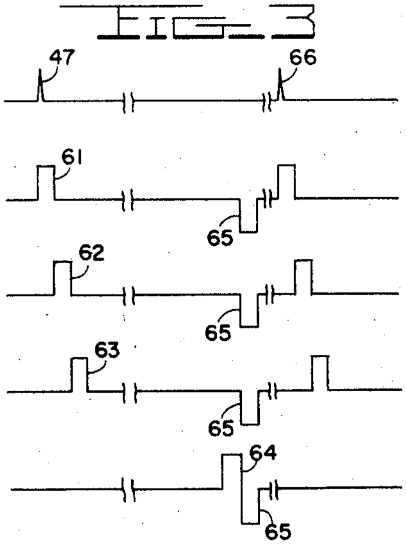
Fig. 3 is a graphic representation of the relationship of the trigger pulses at input 22 to the sequential output pulses from the windings of "N" successive cores.

Fig. 3 shows the wave form of the relationship of the input pulse 47 at point 22 in Fig. 1 and the output pulses 61, 62, 63 and 64 provided at the not dotted end of any winding on the magnetic core of the first, second, third and "*n*th" stages, respectively. The pulse at a typical output 34 is shown as pulse 61. The pulse at a typical "*n*th" output 35 is shown as 64, 65. The negative pulses 65 represent the output produced by the changing of the flux saturation of all of the cores from "1" back to "0."

The width of the pulses 61, 62, 63, 64 and 65 is proportional to the time required to switch the condition of the cores from one remanent state to the other. The said time is determined by drive voltage from source 49, circuit resistance and core parameters. It is possible that the circuit values are such that the negative pulse 65 is a mirror image of the positive pulse 64. The second input trigger pulse 66 occurs at any arbitrary time after the disappearance of the pulse 65. The time lapse between input pulses 47 and 66, for effective operation the pulser circuit, cannot be less than the time between the first pulse 47 and the reset pulse 65 with no time limitation thereafter for the appearance of the second input pulse 66.

Figure 4:
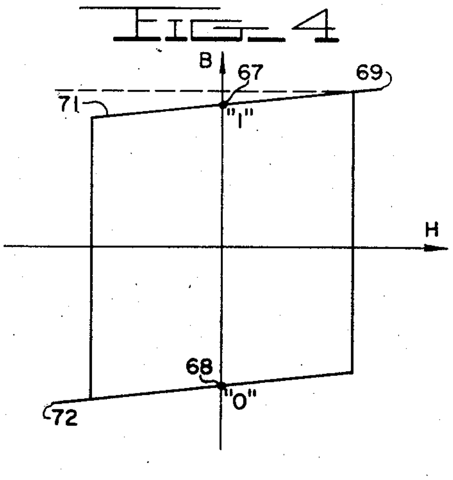
Fig. 4 is an idealized showing of the rectangular hysteresis loop characteristics of the magnetic cores of the type used in this invention.

Fig. 4 is the schematic showing of a hysteresis loop of a binary magnetic core. The positive remanent state of a core during the storage of a "1" is shown by point 67 and the negative remanent state during the storage of a "0" is shown by point 68. The maximum flux density of the core during the shift of a core to a "1" is designated by point 69. After the saturation of the core at point 69, the magnetizing field is removed by the opening of transistor switch 10, for example, and the core saturation falls back to its remanent state 67. The angle of the line 71 of the loop is dependent upon characteristics of the magnetic core. The smaller the loss of saturation after the magnetizing field is removed, the closer to the dotted horizontal line the line 71 becomes. The closer the hysteresis loop is to a rectangle, the nearer the saturation of remanent state 67 will be to the maximum saturation 69. In the negative direction of magnetic induction, the negative remanent state is shown at point 68 for condition "0" and the maximum saturation of the binary core is shown at 72.

Fig. 5 is a modification of the circuit of Fig. 1 which uses the pulse created across a winding such as 24 during the fall from flux saturation 69 to the remanent state 67 as shown in Fig. 4 as a trigger for transistor switch 30. The circuit of Fig. 5 differs from Fig. 1 in that the trigger pulse for the second stage is derived from the dotted end of the switch winding instead of the not dotted end. The reset action is triggered by a positive pulse on the base of transistor switches 20 and 40, such trigger being derived from the induced positive pulses at the dotted ends of windings 38 and 37 during flux change from positive saturation to positive remanence, and the potential rise of point 83 due to opening of transistor switch 30. The pulse at point 83 is coupled to the reset transistor switches by capacitor 82. The circuit can be designed to operate with a direct connection between point 83 and the connecting leads to the switches of the reset circuits of all of the stages instead of capacitor 82, that is, so that the pulse on winding 37 is sufficient to trigger the reset operation.

The use of "N" stages provides for "N" sequential pulses following a single input pulse. Such sequential pulses can be used for sequential switching. The substitution of resistive measuring devices for resistors such as 27, 75, 36 and 43 provides a telemetering device.

It is seen that no energy is required to maintain the magnetic cores in either state of remanence and that the circuit provides for use of the power supply only during switching of the cores from one state of remanence to another.

The input pulse alone triggers the pulsing operation. The maximum magnitude required of the input pulse need not exceed that which is sufficient to switch transistor switch 10. No "clock" nor other auxiliary source of potential is required to initiate the operation of the pulser circuit. Since the trigger pulse alone initiates the operation of the pulser, the pulses can be supplied in any frequency, or after any arbitrary time, limited only by the minimum time required between the arrival of the first input pulse and the completion of the resetting of the cores to "0" after all of the stages have been operated.

It is seen that I have provided an efficient sequential pulser circuit which is usable at comparatively high frequencies, such frequencies being dependent upon circuit impedances, power supply values and core parameters.

It should be understood, of course, that the foregoing disclosure relates to only preferred embodiments of the invention and that numerous modifications or alterations may be made therein without departing from the spirit and the scope of the invention as set forth on the appended claims.

What is claimed is:

1. Apparatus for producing sequential pulses upon the receipt of an input signal comprising, a plurality of pulser stages, each of said stages including binary means capable of being stabilized in either of two states, means to simultaneously provide identical states of stability in each of said binary means, means responsive to said input signal to change the state of stability of one of said binary means, means responsive upon the completion of the change of stability of said one of said binary means to trigger the operation of a second of said pulser stages.

2. Apparatus for producing sequential pulses upon the receipt of an input signal comprising, a plurality of pulser stages, binary means capable of being stabilized in either of two states, one of said binary means for each said stage, binary stability changing means in each stage, binary stability reset means in each said stage, said binary stability changing means in a first stage responsive to said input signal, means responsive to the completion of the operation of the said binary stability change means in said first stage to produce a trigger pulse, said binary stability changing means in a second stage responsive to said trigger pulse, means responsive to the completion of the operation of the said binary stability change means in said second stage to produce a reset trigger pulse whereby all the said binary stability reset means are operated.

3. Apparatus for producing sequential pulses upon the receipt of an input signal comprising, a plurality of stages, each of said stages including binary means capable of being stabilized in either of two states, binary stability changing means, binary stability reset means, power supply means connected to said binary stability changing means and to said binary stability reset means, switch means in said binary stability changing means and said binary stability reset means, said switch means in the binary stability changing means of a first stage being closed by said input signal to operate the binary stability changing means of said first stage, switch control means coupled to said switch means and said binary means to maintain said switch means closed during the change of stability of the binary means of said first stage, means coupled between the binary stability changing means of said first stage and the switch means of the binary stability changing means of a second stage responsive to the completion of the change of stability of the binary means of said first stage to close said last said switch means to operate the binary stability changing means of said second stage, the remaining stages of said plurality of stages being sequentially operative as the first and second stages are operative, means coupled to said binary means of the last stage and connected to said stability reset means of each of the other of said plurality of stages responsive to the completion of the change of stability of the binary means of said last stage whereby all of the said binary means are stabilized in the same state.

4. Apparatus for producing sequential pulses upon the receipt of an input signal comprising, a plurality of stages, binary means in each of said stages capable of being stabilized in either of two states, binary stability changing means and binary stability reset means in each of said stages, power supply means connected to said binary stability changing means and said binary stability reset means, switch means provided in said binary stability changing means and said binary stability reset means, said switch means in said binary stability changing means of a first of said stages being closed by said input signal to initiate the operation of said first stage binary stability changing means, switch control means in each of said stages to maintain any closed switch means in closed condition until the completion of the change of stability of the said binary means, closing means responsive upon the completion of the said change of stability of said binary means of said first stage to close said switch means in said binary stability changing means of a second of said stages, initiating means responsive to the completion of the change of stability of the binary means of the last of said stages to initiate the operation of said switch means in said binary stability reset means of each of said stages.

5. Apparatus of claim 4 wherein said closing means comprises pulse generating circuit means coupled between the power supply and the binary stability changing means in the first said stage to the switch means of the binary stability changing means of the said second stage.

6. Apparatus of claim 4 wherein said closing means comprises pulse generating circuit means coupled between the binary stability changing means in the first said stage and the switch means therefor to the switch means of the binary stability changing means of the said second stage.

7. Apparatus of claim 4 wherein said initiating means comprises inductive means coupled to the binary means in said last stage and the switch means in said reset means in all of said stages.

8. Apparatus of claim 7 wherein said initiating means includes capacitive means coupled between the stability changing means of said last stage and the switch means of the binary stability reset switch means of all of said stages.

9. Apparatus for producing sequential pulses upon the receipt of an input signal comprising, a plurality of pulser stages, magnetic core means in each of said stages capable of being stabilized in either of two states of flux alignment, flux alignment changing windings and flux alignment reset windings on each of said magnetic core means, power supply means connected to said flux alignment changing windings and said flux alignment reset windings, transistor switch means coupled to said flux alignment changing windings and said flux alignment changing winding of the magnetic core of a first of said pulser stages being closed by said input signal to initiate the change of the flux alignment of said magnetic core, transistor switch control winding coupled to said transistor switch means to initiate said transistor switch means closed until the said change of flux alignment is completed, first pulse generating means coupled between said power supply and said flux alignment changing winding of said first pulser stage to the transistor switch means of the flux alignment changing winding of the magnetic core of a second of said pulser stages responsive upon the completion of the said change of flux alignment of said magnetic core of said first pulser stage to close the last said transistor switch means and to initiate flux alignment change in said magnetic core means of said second stage, second pulse generating means responsive upon the completion of the last said flux alignment change coupled between said power supply and the transistor switch means of said flux alignment reset circuit in each of said stages.

10. Apparatus for producing sequential pulses upon the receipt of an input signal comprising, a plurality of stages, a magnetic core in each of said stages, said magnetic core having a substantially square hysteresis loop and being capable of being stabilized in either of two states, stability state changing means and stability state reset means in each of said stages coupled to said magnetic core, power supply means connected to said stability state changing means and said stability state reset means, switch means provided in said stability state changing means and said stability state reset means, said switch means in said stability state changing means of a first of said stages being closed by said input signal to initiate the operation of said first stage stability state changing means, switch control means in each of said stages to maintain any closed switch means in closed condition until the completion of the change of stability of the said magnetic core, closing means responsive upon the completion of the said change of stability of said magnetic core of said first stage to close said switch means in said stability state changing means of a second of said stages, initiating means responsive to the completion of the change of stability of the magnetic core of the last of said stages to initiate the operation of said switch means in said stability state reset means of each of said stages.

No references cited.